United States Patent
Nishimura

(10) Patent No.: US 9,697,851 B2
(45) Date of Patent: Jul. 4, 2017

(54) NOTE-TAKING ASSISTANCE SYSTEM, INFORMATION DELIVERY DEVICE, TERMINAL, NOTE-TAKING ASSISTANCE METHOD, AND COMPUTER-READABLE RECORDING MEDIUM

(71) Applicant: NEC Solution Innovators, Ltd., Tokyo (JP)

(72) Inventor: Tomonari Nishimura, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 14/777,784

(22) PCT Filed: Feb. 20, 2014

(86) PCT No.: PCT/JP2014/054010
§ 371 (c)(1),
(2) Date: Sep. 17, 2015

(87) PCT Pub. No.: WO2014/148190
PCT Pub. Date: Sep. 25, 2014

(65) Prior Publication Data
US 2016/0300587 A1    Oct. 13, 2016

(30) Foreign Application Priority Data
Mar. 19, 2013   (JP) ................. 2013-056292

(51) Int. Cl.
*G10L 25/78*   (2013.01)
*G09B 21/00*   (2006.01)
(Continued)

(52) U.S. Cl.
CPC .............. *G10L 25/78* (2013.01); *G06Q 10/10* (2013.01); *G09B 21/009* (2013.01); *G10L 15/04* (2013.01);
(Continued)

(58) Field of Classification Search
CPC ................. G10L 25/78; G06Q 10/10
See application file for complete search history.

(56) References Cited

U.S. PATENT DOCUMENTS 5,749,071 A * 5/1998 Silverman ............... G10L 13/10
704/258
5,774,854 A * 6/1998 Sharman ................ G10L 13/08
704/260

(Continued)

FOREIGN PATENT DOCUMENTS

| JP | 2003-223199 A | 8/2003 |
| JP | 2003-223200 A | 8/2003 |

(Continued)

OTHER PUBLICATIONS

International Search Report corresponding to PCT/JP2014/054010, dated May 13, 2014 (7 pages).

(Continued)

*Primary Examiner* — Douglas Godbold
(74) *Attorney, Agent, or Firm* — Wilmer Cutler Pickering Hale and Dorr LLP

(57) ABSTRACT

A note-taker terminal (200) and an information delivery device (100) are used. The information delivery device (100) includes a breathing detection unit (104) that specifies breathing sections from silent sections of uttered speech, a data processing unit (105) that determines, for every allocated time period of a note-taker, whether a breathing section exists in a range based on an end point of the allocated time period, and generates, if a breathing section exists, speech data of the utterance from a start point of the allocated time period until the breathing section, and, if a breathing section does not exist, speech data of the utterance from the start point until the end point of the allocated time period, and a data transmission unit (106) that transmits the speech data to the note-taker terminal (200). The note-taker (Continued)

terminal (200) receives the speech data, and transmits input text data to a user terminal (300) of a note-taking user.

7 Claims, 8 Drawing Sheets

(51) Int. Cl.
*G06Q 10/10* (2012.01)
*G10L 15/04* (2013.01)
*G10L 21/10* (2013.01)
*G10L 21/06* (2013.01)

(52) U.S. Cl.
CPC ........ *G10L 21/10* (2013.01); *G10L 2021/065* (2013.01); *G10L 2025/783* (2013.01)

(56) References Cited

U.S. PATENT DOCUMENTS

| | | | | |
|---|---|---|---|---|
| 6,064,964 | A * | 5/2000 | Yamamoto | G10L 25/78 704/270 |
| 6,505,153 | B1 * | 1/2003 | Van Thong | H04N 5/278 348/462 |
| 8,843,372 | B1 * | 9/2014 | Isenberg | G10L 17/26 704/250 |
| 2002/0010916 | A1 * | 1/2002 | Thong | H04N 5/278 725/1 |
| 2007/0118374 | A1 * | 5/2007 | Wise | G10L 15/26 704/235 |
| 2009/0170478 | A1 * | 7/2009 | Doulton | H04L 12/5835 455/413 |
| 2009/0319265 | A1 * | 12/2009 | Wittenstein | G10L 21/04 704/234 |
| 2011/0112833 | A1 * | 5/2011 | Frankel | G10L 15/32 704/235 |
| 2012/0191457 | A1 * | 7/2012 | Minnis | G10L 13/10 704/260 |
| 2014/0303968 | A1 * | 10/2014 | Ward | G10L 25/90 704/207 |

FOREIGN PATENT DOCUMENTS

| | | |
|---|---|---|
| JP | 2007-256714 A | 10/2007 |
| JP | 2012-215962 A | 11/2012 |
| JP | 2013-015939 A | 1/2013 |
| JP | 2013-182353 A | 9/2013 |

OTHER PUBLICATIONS

Japanese Office Action issued in corresponding Japanese Patent Application No. 2015-506661, dated Nov. 8, 2016, 5 pages.

Kazuki Hirozawa et al., "About the input support improvement by remote summary note", Proceedings of the 75th National Convention of Information Processing Society of Japan (4), Mar. 6, 2013, pp. 4-407-4-408.

* cited by examiner

NOTE-TAKING ASSISTANCE SYSTEM, INFORMATION DELIVERY DEVICE, TERMINAL, NOTE-TAKING ASSISTANCE METHOD, AND COMPUTER-READABLE RECORDING MEDIUM

CROSS-REFERENCE TO RELATED APPLICATIONS

This application is a national stage application of International Application No. PCT/JP2014/054010 entitled "Note-Taking Assistance System, Information Delivery Device, Terminal, Note-Taking Assistance Method, and Computer-Readable Recording Medium," filed on Feb. 20, 2014, which claims priority to Japanese Patent Application No. 2013-056292, filed on Mar. 19, 2013. The disclosures of each which are hereby incorporated by reference in their entirety.

TECHNICAL FIELD

The present invention relates to a note-taking assistance system, an information delivery device, a terminal and a note-taking assistance method that are for assisting note-taking with respect to a speaker, and a computer-readable recording medium storing a computer program for realizing the same.

BACKGROUND ART

A hearing-impaired person with hearing loss of 100 dB or more in both ears (hereinafter, simply "hearing-impaired person") will be virtually incapable of understanding spoken linguistic information in speech even with hearing aids or the like. It has thus conventionally been the case that when a hearing-impaired person attends a lecture, school classes or the like, a sign language interpreter or a note-taking interpreter would be provided.

Of these, when a note-taking interpreter is provided, two or more note-taking interpreters are usually provided for every hearing-impaired person in the case of school classes, for example. These note-takers use a PC (personal computer), a paper notebook or the like to transcribe what the teacher is saying and so on, and present this transcription to the hearing-impaired person. Two or more note-taking interpreters are needed because note-taking is demanding work and the accuracy of the summary tends to suffer with one person.

A survey conducted by the Ministry of Health, Labour and Welfare in 2008 found that in Japan there are approximately 20,000 hearing-impaired students aged 18 and under, whereas the number of note-taking interpreters that are formally registered is approximately 10,000. On that basis, assuming that two or more note-taking interpreters are provided for every hearing-impaired student, a simple calculation indicates that only a quarter of all hearing-impaired students are able to receive assistance. Furthermore, there are regional differences in the number of note-takers and the number of hearing-impaired students. For these reasons, the current reality is that only a very small number of hearing-impaired students can receive assistance at school.

In view of this, various organizations are involved in training and the like in order to increase the number of note-taking interpreters, with new note-taking interpreters being registered as note-takers after having developed their skills with a year of mandatory courses and training, and the like. However, there is a problem in that the number of note-takers has only increased marginally, and thus there are still many hearing-impaired students who cannot receive assistance.

Patent Documents 1 and 2 disclose systems that assist transcribers when writing captions. The systems disclosed in Patent Documents 1 and 2 are provided with a function of adjusting the reproduction speed of speech and a function of automatically combining text data that is input by a captionist with video data. It is thought that such systems could also contribute to resolving the problem of insufficient numbers of note-taking interpreters.

Patent Document 3 discloses a system in which speech recognition is performed on speech during a presentation, with the recognition results being corrected in real time and the corrected recognition results being displayed as captions. It is thought that implementing the system disclosed in Patent Document 3 could certainly contribute to resolving the problem of insufficient numbers of note-taking interpreters.

LIST OF PRIOR ART DOCUMENTS

Patent Documents

Patent Document 1: JP 2003-223199A
Patent Document 2: JP 2003-223200A
Patent Document 3: JP 2007-256714A

DISCLOSURE OF THE INVENTION

Problems to be Solved by the Invention

However, the systems disclosed in Patent Documents 1 and 2 are directed to assisting transcribers when they create captions of speech listened to while watching video before the video is broadcast or televised, and are not directed to assistance when transcribing utterances in real time. It would thus be difficult to overcome the shortage of note-taking interpreters through employing the system disclosed in Patent Document 1 or 2.

On the other hand, while the system disclosed in Patent Document 3 conceivably avoids the problems with Patent Documents 1 and 2 because captions can be displayed in real time to utterances, the fact that speech recognition is performed gives rise to problems associated therewith.

That is, with the system disclosed in Patent Document 3, automatic candidate presentation or manual candidate presentation is performed according to the current processing state, based on one or more character string candidates and certainty factors for the respective character string candidates, in order to improve speech recognition accuracy. Additionally, when candidates cannot be presented in the case of manual candidate presentation, candidates are presented based on matching scores.

However, the recognition rate of speech recognition may drop greatly depending on the environment in which the utterances are made. For example, this may be the case where the ambient noise of the surrounding area is loud relative to the uttered speech, where a plurality of speakers are speaking at the same time, or where dialect or abbreviated speech is used. In such cases, there is a problem in that the system disclosed in Patent Document 3 cannot provide accurate information.

An exemplary object of the present invention is to solves the above problems and provide a note-taking assistance system, an information delivery device, a note-taking assistance method and a computer-readable recording medium that can provide a hearing-impaired person with accurate information, even in the case where the person carrying out the note-taking has little note-taking experience.

Means for Solving the Problems

In order to achieve the above object, a note-taking assistance system according to one aspect of the present invention is a system for assisting note-taking of an utterance of a speaker, including a terminal for note-takers that is used by a note-taker who performs the note-taking, and an information delivery device that transmits speech data of the utterance to the terminal, the information delivery device including a breathing detection unit that specifies silent sections from speech of the utterance, and specifies a silent section that satisfies a set condition, among the specified silent sections, as a breathing section of the speaker, a data processing unit that determines, for every allocated time period that is allocated to the note-taker, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period, and a data transmission unit that transmits the speech data generated by the data processing unit to the terminal of the note-taker to whom the allocated time period is allocated, and the terminal for note-takers including a data reception unit that receives the speech data transmitted from the information delivery device, an input unit that accepts input of text data that is input in correspondence to the speech data, and a data transmission unit that transmits the text data whose input was accepted to a terminal for users that is used by a user of the note-taking.

Also, in order to achieve the above object, an information delivery device according to one aspect of the present invention is a device for transmitting speech data of an utterance of a speaker to a terminal for note-takers that is used by a note-taker who performs note-taking of the utterance, including a breathing detection unit that specifies silent sections from speech of the utterance, and specifies a silent section that satisfies a set condition, among the specified silent sections, as a breathing section of the speaker, a data processing unit that determines, for every allocated time period that is allocated to the note-taker, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period, and a data transmission unit that transmits the speech data generated by the data processing unit to the terminal of the note-taker to whom the allocated time period is allocated.

In order to achieve the above object, a terminal according to one aspect of the present invention is a terminal that is used by a note-taker who performs note-taking of an utterance of a speaker, including a data reception unit that receives, for every allocated time period that is allocated to the note-taker, speech data of the utterance from an information delivery device that transmits the speech data, an input unit that accepts input of text data that is input in correspondence to the speech data, and a data transmission unit that transmits the text data whose input was accepted to a terminal for users that is used by a user of the note-taking.

Also, in order to achieve the above object, a note-taking assistance method according to one aspect of the present invention is a method for assisting note-taking using a terminal for note-takers that is used by a note-taker who performs note-taking of an utterance of a speaker and an information delivery device that transmits speech data of the utterance to the terminal, including the steps of (a) using the information delivery device to specify silent sections from speech of the utterance, and specify a silent section that satisfies a set condition, among the specified silent sections, as a breathing section of the speaker, (b) using the information delivery device to determine, for every allocated time period that is allocated to the note-taker, whether the breathing section exists in a range that is based on an end point of the allocated time period, and generate, in a case where the breathing section exists in the range, speech data of the utterance from a start point of the allocated time period until the breathing section, and, in a case where the breathing section does not exist in the range, speech data of the utterance from the start point until the end point of the allocated time period, (c) using the information delivery device to transmit the speech data generated in the step (b) to the terminal of the note-taker to whom the allocated time period is allocated, (d) using the terminal for note-takers to receive the speech data transmitted from the information delivery device, (e) using the terminal for note-takers to accept input of text data that is input in correspondence to the speech data, and (f) using the terminal for note-takers to transmit the text data whose input was accepted in the step (e) to a terminal for users that is used by a user of the note-taking.

In order to achieve the above object, a first computer-readable recording medium according to one aspect of the present invention is a computer-readable recording medium storing a computer program for transmitting, by computer, speech data of an utterance of a speaker to a terminal for note-takers that is used by a note-taker who performs note-taking of the utterance, the computer program including a command for causing the computer to execute the steps of (a) specifying silent sections from speech of the utterance, and specifying a silent section that satisfies a set condition, among the specified silent sections, as a breathing section of the speaker, (b) determining, for every allocated time period that is allocated to the note-taker, whether the breathing section exists in a range that is based on an end point of the allocated time period, and generating, in a case where the breathing section exists in the range, speech data of the utterance from a start point of the allocated time period until the breathing section, and, in a case where the breathing section does not exist in the range, speech data of the utterance from the start point until the end point of the allocated time period, and (c) transmitting the speech data generated in the step (b) to the terminal of the note-taker to whom the allocated time period is allocated.

Also, in order to achieve the above object, a second computer-readable recording medium according to one aspect of the present invention is a computer-readable recording medium storing a computer program that includes a command for causing a computer that is used by a note-taker who performs note-taking of an utterance of a speaker to execute the steps of (a) receiving, for every allocated time period that is allocated to the note-taker, speech data of the utterance from an information delivery device that transmits the speech data, (b) accepting input of text data that is input in correspondence to the speech data, and (c) transmitting the text data accepted in the step (b) to a terminal for users that is used by a user of the note-taking.

Advantageous Effects of the Invention

According to the present invention, as described above, a hearing-impaired person can be provided with accurate information, even in the case where the person carrying out the note-taking has little note-taking experience.

MODE FOR CARRYING OUT THE INVENTION

Overview of Invention

The present invention assists a note-taker who performs note-taking on the utterances of a speaker. In the present invention, an information delivery device partitions the speech data of a speaker based on an allocated time period that is allocated to the note-taker, and transmits the obtained speech data to a terminal of the note-taker via a network.

At this time, the length of the allocated time period that is allocated to the note-taker is set according to the note-taking ability of the note-taker, for example. Specifically, in the case where the note-taker has little note-taking experience, a short time period such as less than 30 seconds is allocated. The speech data is partitioned according to the timing of the breathing of the speaker. Thus, even in the case where the note-taker has little experience and finds it difficult to create a summary in a short time, a summary that will be readily understood by a hearing-impaired person, who is the user, will be created.

Also, in a preferred mode of the present invention, the information delivery device is able to deliver not only speech data but also video to the note-taker's terminal. In this mode, the note-taker is able to select the most suitable scene to summarize from the delivered video, and a still image of the scene selected by the note-taker is transmitted to a user's terminal together with text data of the summary. The user's understanding of the summary will thus be further enhanced. At this time, the note-taker is also able to add his or her own comments to the contents of the note-taking in order to help the user's understanding.

Furthermore, in the above preferred mode, the information delivery device is able to acquire video from a plurality of cameras that capture the area around the speaker, and can deliver the video acquired from the plurality of cameras to the note-taker's terminal. In this case, the note-taker can select a more suitable scene.

Embodiment

Hereinafter, a note-taking assistance system, an information delivery device, terminals, a note-taking assistance method, and a computer program in the embodiment of the present invention will be described, with reference to FIGS. 1 to 7.

System Configuration

Figure 1:
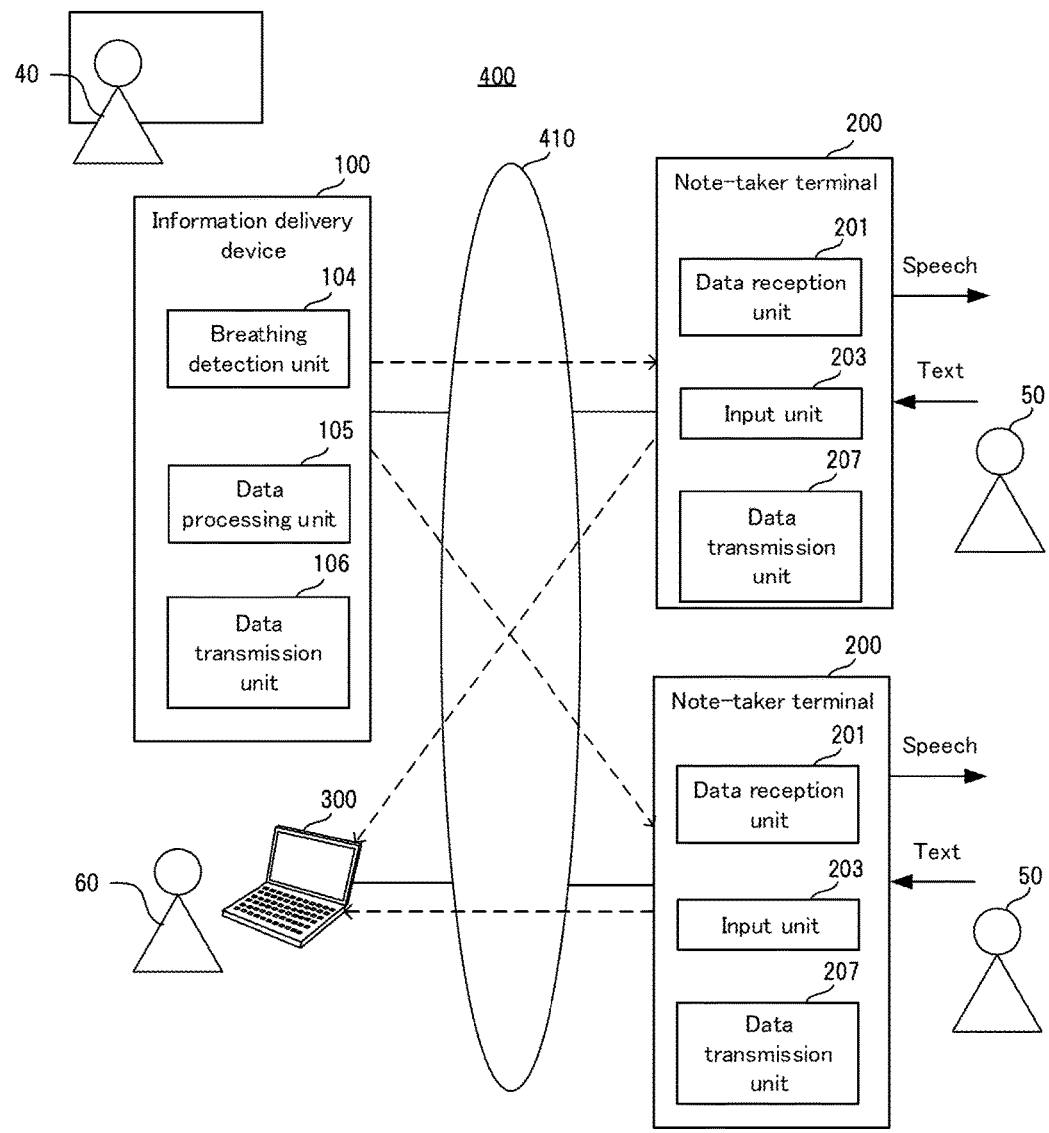
FIG. 1 is a configuration diagram showing the overall configuration of a note-taking assistance system in an embodiment of the present invention.

Initially, the system configuration of the note-taking assistance system will be described using FIG. 1. FIG. 1 is a configuration diagram showing the overall configuration of the note-taking assistance system in the embodiment of the present invention.

A note-taking assistance system 400 of the present embodiment shown in FIG. 1 is a system for assisting note-taking of the utterances of a speaker 40. As shown in FIG. 1, the note-taking assistance system 400 is provided with terminals 200 for note-takers (hereinafter, "note-taker terminals") that are used by note-takers 50 who perform note-taking, and an information delivery device 100 that transmits speech data of the utterances to the note-taker terminals 200.

Also, in FIG. 1, a terminal 300 is a terminal for users (hereinafter, "user terminal") that is used by a hearing-impaired person who is a note-taking user 60. The user 60 is able to receive the note-taking service provided by the note-takers 50 via the user terminal 300.

Also, in the present embodiment, the information delivery device 100, the note-taker terminals 200 and the user terminal 300 are connected via a network 410 such as the Internet, and exchange information with each other. Note that although there are two note-taker terminals 200 and one user terminal 300 in the example in FIG. 1, the number of these terminals is not particularly limited.

As shown in FIG. 1, the information delivery device 100 is provided with a breathing detection unit 104, a data processing unit 105, and a data transmission unit 106. Of these, the breathing detection unit 104 specifies silent sections from uttered speech, and specifies silent sections that satisfy a set condition among the specified silent sections as breathing sections of the speaker 40.

The data processing unit 105 first determines, for every time period that is allocated to each note-taker 50 (hereinafter, "allocated time period"), whether a breathing section exists in a range that is based on an end point of one of the allocated time periods. In the example in FIG. 1, there are two note-takers 50, so allocated time periods in which the respective note-takers 50 perform note-taking are allocated alternately to each note-taker 50.

Then, in the case where it is determined that a breathing section exists in the range, the data processing unit 105 generates speech data of utterances from a start point of the corresponding allocated time period until the breathing section. On the other hand, in the case where it is determined that a breathing section does not exist in the range, the data processing unit 105 generates speech data of utterances from the start point until the end point of that allocated time period.

The data transmission unit 106 transmits the speech data (hereinafter, "speech data for note-taking") generated by the data processing unit 105 to the note-taker terminal 200 of the note-taker 50 to whom that allocated time period is allocated.

Also, as shown in FIG. 1, the note-taker terminal 200 is provided with a data reception unit 201, an input unit 203, and a data transmission unit 207. Of these, the data reception unit 201 receives the speech data for note-taking transmitted from the information delivery device 100.

The input unit 203 accepts input of text data that is input in correspondence to the received speech data for note-taking. The data transmission unit 207 transmits the text data whose input was accepted to the user terminal 300.

In the present embodiment, as described above, speech data matched with allocated time periods is transmitted to each note-taker 50, enabling temporally short speech data to be transmitted in the case where the note-takers have little experience. Also, the data is partitioned according to the timing of the breathing of the speaker. Thus, even in the case where the note-taker has little experience and finds it difficult to create a summary in a short time, a summary that will be readily understood by a hearing-impaired person, who is the user, will be created.

Particularly in the case where the allocated time period is set to a short time period such as less than 30 seconds, the note-taker 50 need only directly textualize what he or she hears spoken, thus enabling support to be provided to a hearing-impaired person even if the note-taker 50 has not received full specialist training. Also, given that the note-taker terminal 200 need only be connected to the information delivery device 100 and the user terminal 300 via the network 410, the note-taker 50 can perform note-taking, even from a remote location. For the above reasons, the present embodiment enables an increase in the number of hearing-impaired persons who can receive support through note-taking, because of being able to lower the barriers to involvement in note-taking.

Figure 2:
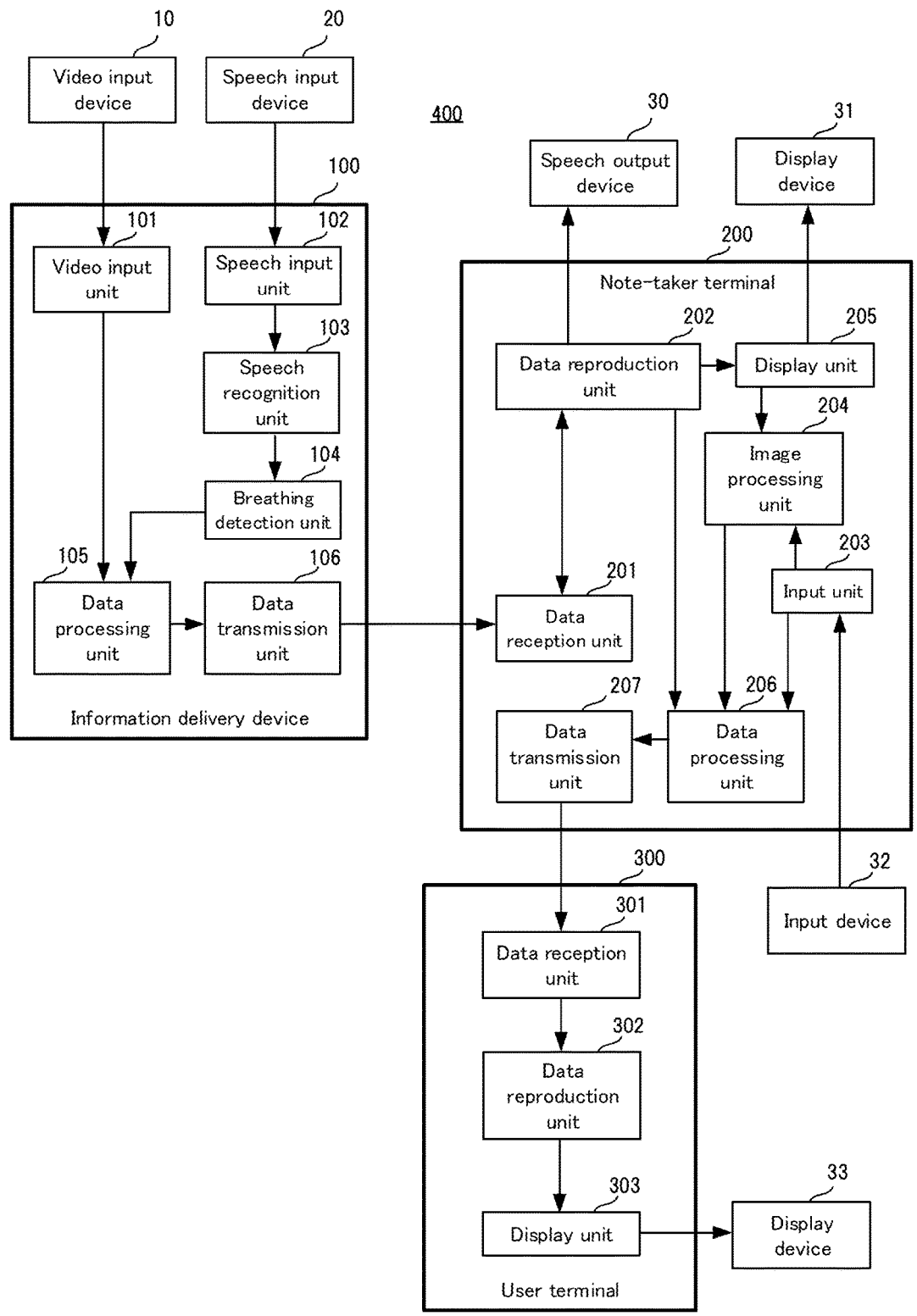
FIG. 2 is a block diagram specifically showing the configuration of the note-taking assistance system in the embodiment of the present invention.

Next, the configurations of the note-taking assistance system 400, the information delivery device 100, the note-taker terminal 200, and the user terminal 300 will be described more specifically using FIGS. 2 and 3. FIG. 2 is a block diagram specifically showing the configuration of the note-taking assistance system in the embodiment of the present invention. Also, in the following example, it is assumed that the note-taking assistance system 400 is used for lectures given at schools, speaking engagements and the like, for example.

System Configuration: Information Delivery Device

As shown in FIG. 2, a video input device 10 and a speech input device 20 are connected to the information delivery device 100. The video input device 10 is a camera that captures a view of the lecture or the like, and functions to output video data to the information delivery device 100. The speech input device 20 is a microphone, and functions to convert the uttered speech of speakers including the lecturer into speech data and output the resultant speech data to the information delivery device 100.

Also, as shown in FIG. 2, the information delivery device 100 is provided with a video input unit 101, a speech input unit 102 and a speech recognition unit 103, in addition to the breathing detection unit 104, the data processing unit 105 and the data transmission unit 106.

The video input unit 101 receives the video data that is output from the video input device 10, and inputs this video data to the data processing unit 105. In this case, the data processing unit 105 divides the input video data according to the allocated time period, and outputs the divided video data to the data transmission unit 106. Thereafter, the data transmission unit 106 transmits the divided video data to the note-taker terminal 200 of the note-taker 50 to whom that allocated time period is allocated together with speech data for note-taking.

The speech input unit 102 receives the speech data that is output from the speech input device 20, and outputs this speech data to the speech recognition unit 103. The speech recognition unit 103 separates this speech data into sections (silent sections) in which a state regarded as silence where the sound level is at or below a set value is ongoing, and sections (speech sections) in which a state where this is not the case is ongoing. In the present embodiment, the breathing detection unit 104 specifies silent sections from the processing result of the speech recognition unit 103, and, in the case where the length of a specified silent section is less than or equal to a threshold, specifies the specified silent section as a breathing section of the speaker 40.

Here, the processing that is performed by the speech recognition unit 103, the breathing detection unit 104 and the data processing unit 105 will be described using FIG. 3. FIG. 3 is a schematic diagram showing processing by the speech recognition unit, the breathing detection unit and the data processing unit that are shown in FIG. 2.

Figure 3:
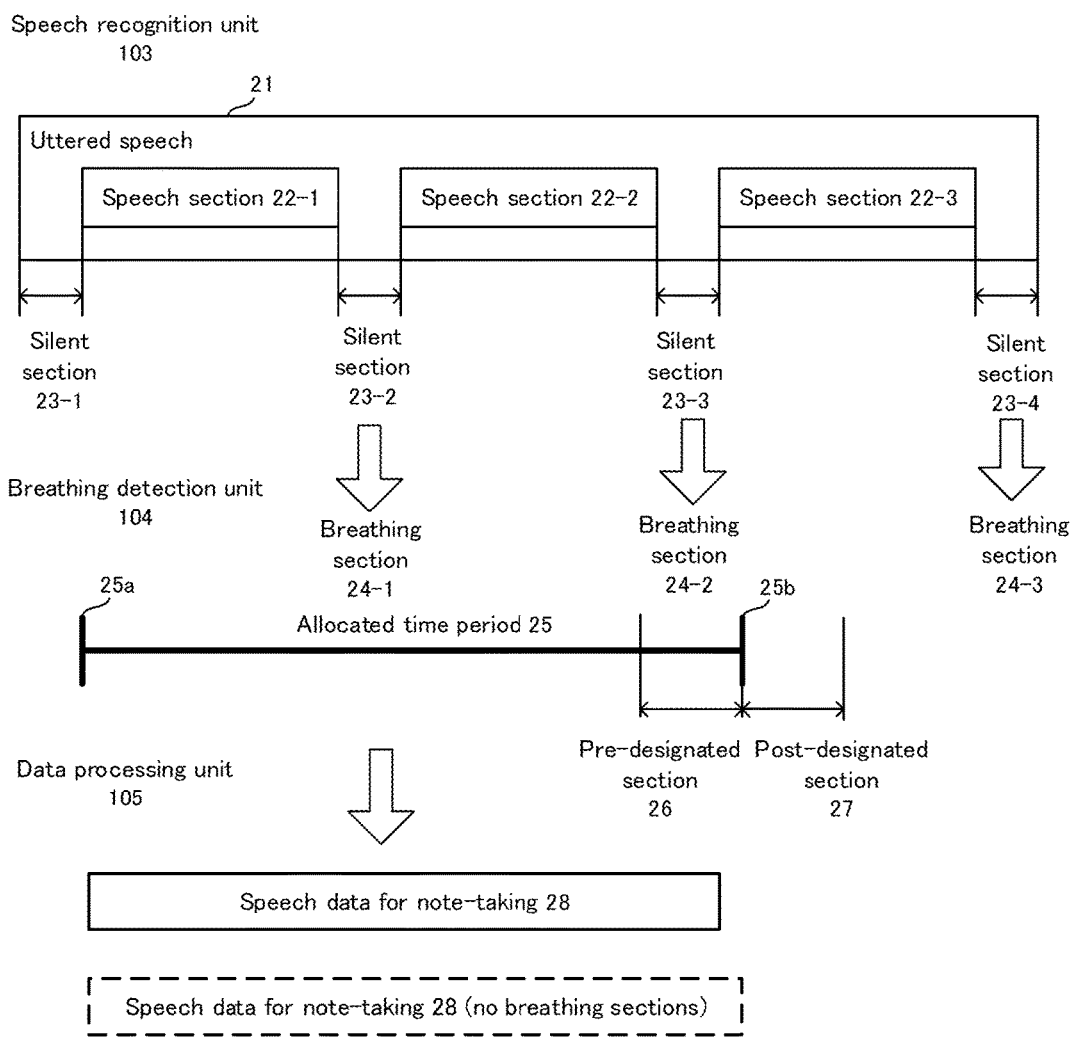
FIG. 3 is a schematic diagram showing processing by a speech recognition unit, a breathing detection unit and a data processing unit that are shown in FIG. 2.

As shown in FIG. 3, the speech recognition unit 103, upon speech data of uttered speech 21 being input from the speech input unit 102, separates this speech data into speech sections 22-1 to 22-3 and silent sections 23-1 to 23-4. In the present embodiment, separation of speech sections and silent sections can be performed by using an existing speech recognition engine. The speech recognition unit 103 then outputs information specifying the positions of the separated silent sections 23-1 to 23-4 to the breathing detection unit 104.

The breathing detection unit 104 specifies the silent sections 23-1 to 23-4 based on the information from the speech recognition unit 103, and determines, for each silent section, whether the length of the silent section is less than or equal to a threshold. The breathing detection unit 104 determines silent sections whose length is less than or equal to the threshold to be breathing, and determines silent sections for which this is not the case to be silence. In the example in FIG. 3, the silent sections 23-2 to 23-4 are respectively determined to be breathing sections 24-1 to 24-3. Note that the threshold in this case need only be set by an administrator of the information delivery device as appropriate according to the situation or the like.

Next, the data processing unit 105 compares the breathing sections 24-1 to 24-3 determined by the breathing detection unit 104 to be breathing with an allocated time period 25 allocated to the note-taker 50. The data processing unit 105 then determines, for each breathing section, whether the breathing section exists in a range that is based on an end point 25*b* of the allocated time period 25. Specifically, the data processing unit 105 determines, for each breathing section, whether the breathing section exists in a section combining a pre-designated section 26 that is set before the end point 25*b* and a post-designated section 27 that is set after the end point 25*b*.

In the example in FIG. 3, the breathing section 24-2 exists in the section combining the pre-designated section 26 and the post-designated section 27, so the data processing unit 105 generates speech data (speech data for note-taking) 28 of utterances from a start point 25*a* of the allocated time period 25 until the breathing section. That is, in this case, the data processing unit 105 changes the end point 25*b* of the allocated time period 25 to the start point of the breathing section 24-2, and generates speech data for note-taking 28. Note that the end point 25b of the allocated time period 25 need only exist in the breathing section 24-2, and may be changed to a point other than the start point, such as an intermediate point or the end point, for example.

On the other hand, in the case where, unlike the example in FIG. 3, none of the breathing sections exist in the section combining the pre-designated section 26 and the post-designated section 27, the data processing unit 105 generates speech data (displayed with a dashed line) of utterances from the start point 25a until the end point 25b of the allocated time period 25.

Also, in the case where a breathing section exists in a range that is based on the end point of allocated time period, the data processing unit 105 changes the end point of the allocated time period to the end point of this breathing section, and changes the start point of the next allocated time period according to this change. Furthermore, in the case where the end point of an allocated time period is changed, the data processing unit 105 divides the abovementioned video data based on the allocated time period after the change.

Also, in the present embodiment, the length of the allocated time period that is allocated to each note-taker 50 is set according to the note-taking ability of the note-taker 50. For example, in the case where the note-taker 50 has little experience, 30 seconds or less is set, so that text input while listening to speech data is not a problem. Also, because the user 60 has difficulty when the allocated time period is too short, the length of the allocated time period is preferably set to 15 seconds or more, for example.

System Configuration: Note-Taker Terminal

As shown in FIG. 2, a speech output device 30, a display device 31, and an input device 32 are connected to the note-taker terminal 200. The speech output device 30 is an audio speaker or the like that is provided in the note-taker terminal 200, for example. The display device 31 is a liquid crystal display or the like that is provided in the note-taker terminal 200, for example. The input device 32 is an input device such as a mouse, a keyboard and a touch panel, and is connected to the input unit 203.

Also, as shown in FIG. 2, the note-taker terminal 200 is provided with a data reproduction unit 202, an image processing unit 204, a display unit 205, and a data processing unit 206, in addition to the data reception unit 201, the input unit 203 and the data transmission unit 207.

The data reproduction unit 202, upon speech data for note-taking and video data being received by the data reception unit 201, acquires this data. The data reproduction unit 202 then outputs the speech data for note-taking to the speech output device 30 to be reproduced. Also, the data reproduction unit 202 outputs the video data to the display unit 205. The display unit 205 displays the video data on a screen of the display device 31.

The image processing unit 204 extracts a still image from the video data according to an instruction from the note-taker 50 that is input from the input device 32 via the input unit 203, and outputs image data of the extracted still image to the data processing unit 206. The data processing unit 206 takes the text data input by the note-taker 50, that is, the contents of the summary, and the image data of the still image that is output from the image processing unit 204 as one data set, and outputs this data set to the data transmission unit 207.

The data transmission unit 207, upon receiving the data set from the data processing unit 206, transmits this data set to the user terminal 300.

System Configuration: User Terminal

As shown in FIG. 2, the user terminal 300 is provided with a data reception unit 301, a data reproduction unit 302, and a display unit 303. Of these, the data reception unit 301 receives the data set transmitted from the note-taker terminal 200, and inputs this data set to the data reproduction unit 302.

The data reproduction unit 302 breaks the data set down into the text data and the image data of the still image that are included therein, and inputs the respective data to the display unit 303. The display unit 303, upon receiving the text data and the image data, displays the respective data in predetermined regions on the screen of a display device 33. The display device 33 is a liquid crystal display or the like that is provided in the user terminal 300, for example, similarly to the display device 31 of the note-taker terminal 200.

Also, the information delivery device 100, the note-taker terminal 200 and the user terminal 300 that were described above can be constructed by causing a computer to execute a computer program that executes processing that will be discussed later. In this case, exemplary computers include personal computers and server computers, as well as smartphones and tablets.

System Operations

Next, operations of the note-taking assistance system 400 in the embodiment of the present invention will be described using FIGS. 4 to 6. In the following description, FIGS. 1 to 3 will be referenced as appropriate. Also, in the present embodiment, a note-taking assistance method is implemented by operating the note-taking assistance system 400. Therefore, the following description of the operations of the note-taking assistance system 400 will be given in place of a description of the note-taking assistance method of the present embodiment.

System Operations: Information Delivery Device

First, operations in the information delivery device 100 will be described using FIG. 4. FIG. 4 is a flow diagram showing operations of the information delivery device in the embodiment of the present invention.

Figure 4:
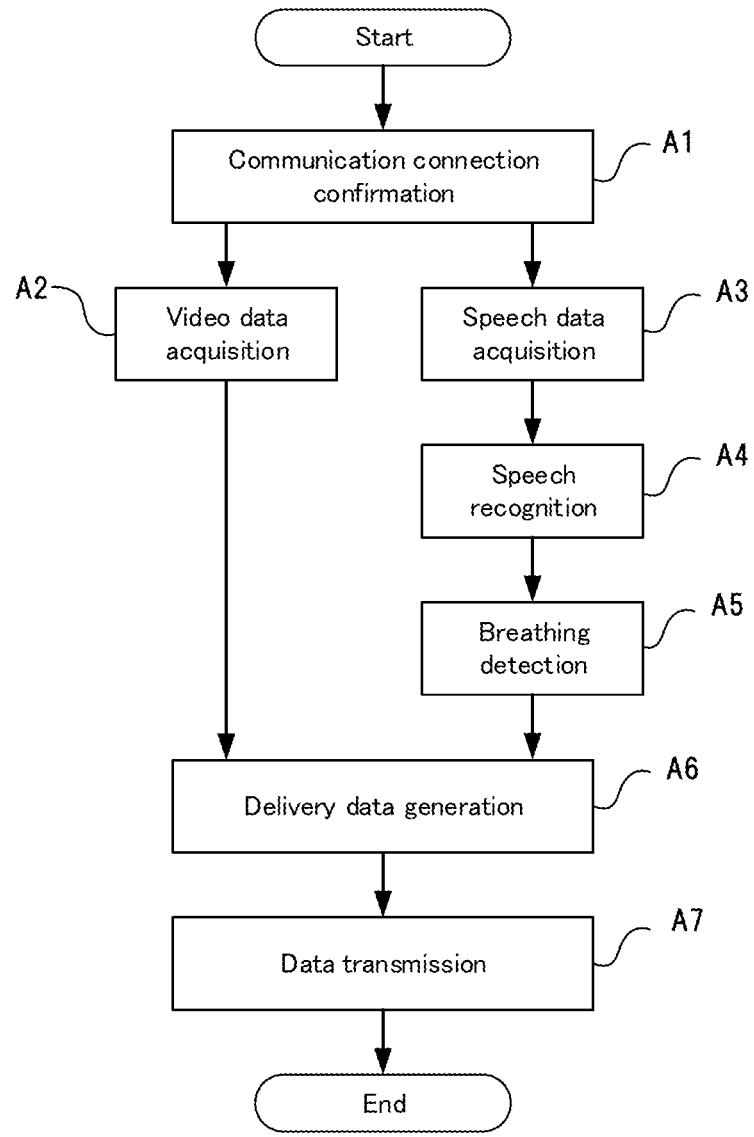
FIG. 4 is a flow diagram showing operations of an information delivery device in the embodiment of the present invention.

Initially, as shown in FIG. 4, the information delivery device 100 executes connection confirmation of network communication between the note-taker terminal 200 and the user terminal 300 (step A1). Specifically, data communication for establishing a connection is performed between a computer program on the information delivery device 100, a computer program on the note-taker terminal 200 and a computer program on the user terminal 300.

The lesson is then started and speakers including the lecturer start speaking. Video data is thereby input from the video input device 10 to the information delivery device 100, and the video input unit 101 starts acquisition of the video data (step A2). Also, the video input unit 101 inputs the acquired video data to the data processing unit 105.

At the same time, speech data is input from the speech input device 20 to the information delivery device 100, and the speech input unit 102 starts acquisition of the speech data (step A3). Also, the speech input unit 102 inputs the acquired speech data to the speech recognition unit 103.

In the present embodiment, exemplary video data includes moving image data generated in a format such as MEPG-4. Also, exemplary speech data includes sound data generated in a format such as PCM.

Next, the speech recognition unit 103, upon speech data being input from the speech input unit 102, separates this speech data into speech sections and silent sections (refer to FIG. 3) (step A4). The speech recognition unit 103 then outputs information specifying the positions of the separated silent sections to the breathing detection unit 104.

Next, the breathing detection unit 104 specifies silent sections based on the information from the speech recognition unit 103, and specifies breathing sections by determining, for each silent section, whether the length of the silent section is less than or equal to a threshold (step A5). Also, the breathing detection unit 104 outputs information specifying the breathing sections to the data processing unit 105.

Next, the data processing unit 105 generates data for delivery (step A6). Specifically, the data processing unit 105 determines, for each breathing section, whether the breathing section exists in a range that is based on the end point of the allocated time period, based on the information received from the breathing detection unit 104, and generates speech data for note-taking based on the determination result (refer to FIG. 3).

Also, the data processing unit 105 divides the video data input from the video input unit 101 according to the allocated time period (or in the case of a change, the allocated time period after the change), and generates video data for delivery. The data processing unit 105 then outputs the speech data for note-taking and the video data for delivery to the data transmission unit 106.

Next, the data transmission unit 106 transmits the video data and the speech data for note-taking that were output to the note-taker terminal 200 of the note-taker 50 to whom the allocated time period of this data is allocated (step A7). Also, the above steps A1 to A7 are repeatedly executed in the information delivery device 100.

System Operations: Note-Taker Terminal

Next, operations in the note-taker terminal 200 will be described using FIG. 5. FIG. 5 is a flow diagram showing operations of the note-taker terminal in the embodiment of the present invention.

Figure 5:
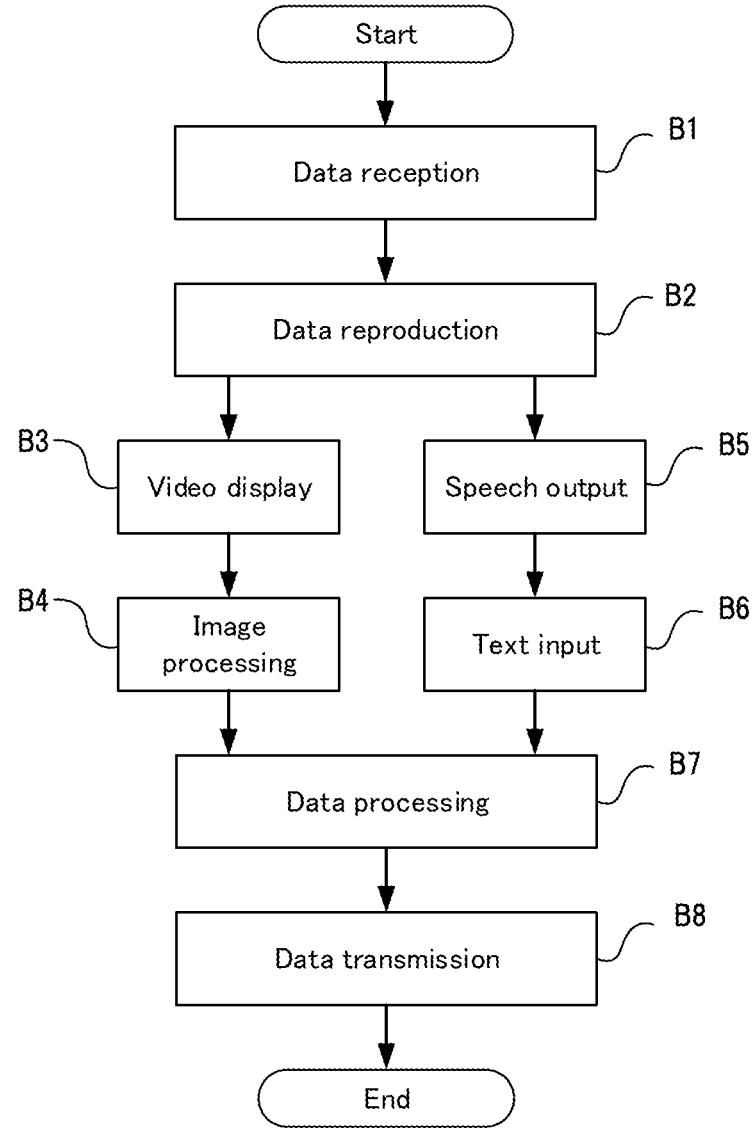
FIG. 5 is a flow diagram showing operations of a note-taker terminal in the embodiment of the present invention.

Initially, as shown in FIG. 5, in the note-taker terminal 200, the data reception unit 201 receives the video data and the speech data for note-taking that were transmitted from the information delivery device 100 (Step B1).

Next, the data reproduction unit 202 outputs the speech data for note-taking to the speech output device 30, and outputs the video data to the display unit 205 (step B2). The display unit 205 thereby displays the video data on the screen of the display device 31 (step B3), and the speech output device 30 reproduces the speech data (step B5).

Next, the image processing unit 204, in the case where the note-taker 50 instructs selection of an image through the input device 32, receives a selection instruction via the input unit 203. The image processing unit 204 then extracts a still image from the video data according to the selection instruction, and outputs image data of the extracted still image to the data processing unit 206 (step B4).

Also, the input unit 203, upon the note-taker 50 inputting text through the input device 32 in correspondence to the speech data for note-taking reproduced at step B5, accepts the text, and outputs text data of the input text to the data processing unit 206 (step B6).

Next, the data processing unit 206 takes the text data that is input by the note-taker 50, that is, the contents of the summary, and the image data of the still image that is output from the image processing unit 204 as one data set, and outputs this data set to the data transmission unit 207 (step B7).

Next, the data transmission unit 207, upon receiving the data set from the data processing unit 206, transmits this data set to the user terminal 300 (step B8). Thereafter, steps B1 to B8 are performed again when the next allocated time period starts.

System Operations: User Terminal

Next, operations in the user terminal 300 will be described using FIG. 6. FIG. 6 is a flow diagram showing operations of the user terminal in the embodiment of the present invention.

Figure 6:
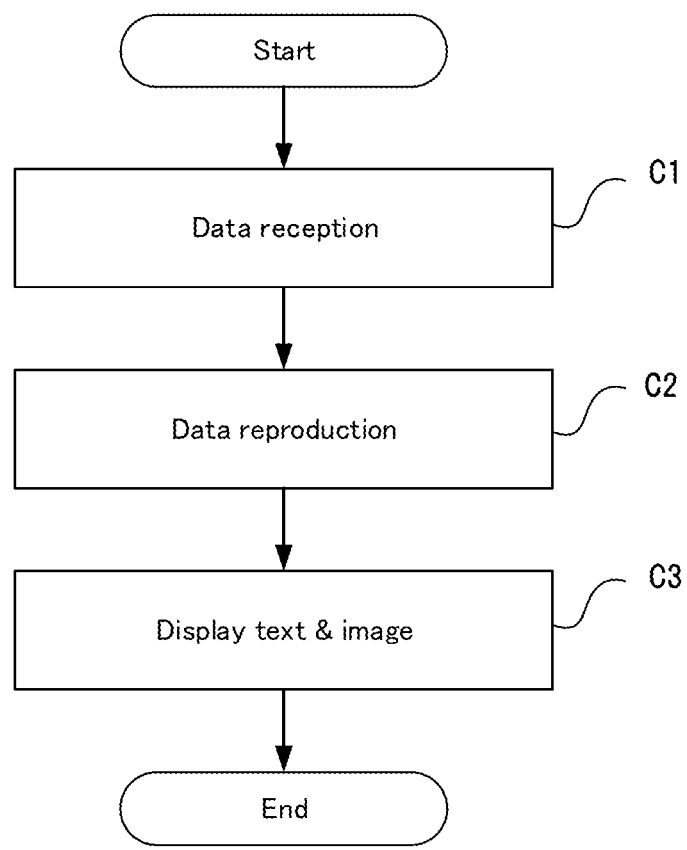
FIG. 6 is a flow diagram showing operations of a user terminal in the embodiment of the present invention.

Initially, as shown in FIG. 6, in the user terminal 300, the data reception unit 301 receives the data set transmitted from the note-taker terminal 200, and inputs this data set to the data reproduction unit 302 (step C1).

Next, the data reproduction unit 302 breaks the data set down into the text data and the image data of the still image that are included therein, and inputs the respective data to the display unit 303 (step C2).

Next, the display unit 303, upon receiving the text data and the image data, displays the respective data in predetermined regions on the screen of the display device 33 (step C3). Steps C1 to C3 are performed whenever a data set is transmitted from the note-taker terminal 200, and text data and video data transmitted from each note-taker terminal 200 are displayed in chronological order. Also, in order to enhance the understanding of the note-taking by the user 60 at this time, the individual text data and the individual video data are preferably displayed on the same time axis.

Effects of the Embodiment

According to the present embodiment as described above, a short time period is allocated to each note-taker 50 and, furthermore, the speech data is partitioned according to the timing of the breathing of the speaker 40, and thus the note-taker 50 need only directly textualize what he or she hears spoken. Therefore, in the case where the note-taker 50 has little experience, note-taking can be provided to a hearing-impaired person even if the note-taker 50 has not received full specialist training. Also, the note-taker terminal 200 need only be connected to the information delivery device 100 and the user terminal 300 via the network 410, and the note-taker 50 may be located in a remote location. For the above reasons, the present embodiment enables an increase in the number of hearing-impaired persons who can receive support through note-taking.

Computer Programs

A first program of the present embodiment may be any program that causes a computer to execute steps A1 to A7 shown in FIG. 4. The information delivery device 100 of the present embodiment can be realized by this program being installed on a computer and executed. In this case, a CPU (Central Processing Unit) of the computer performs processing while functioning as the video input unit 101, the speech input unit 102, the speech recognition unit 103, the breathing detection unit 104, the data processing unit 105, and the data transmission unit 106.

Also, a second program of the present embodiment may be any program that causes a computer to execute steps B1 to B6 shown in FIG. 5. The note-taker terminal 200 of the present embodiment can be realized by this program being installed on a computer and executed. In this case, a CPU (Central Processing Unit) of the computer performs processing while functioning as the data reception unit 201, the data reproduction unit 202, the input unit 203, the image processing unit 204, the display unit 205, the data processing unit 206, and the data transmission unit 207.

Figure 7:
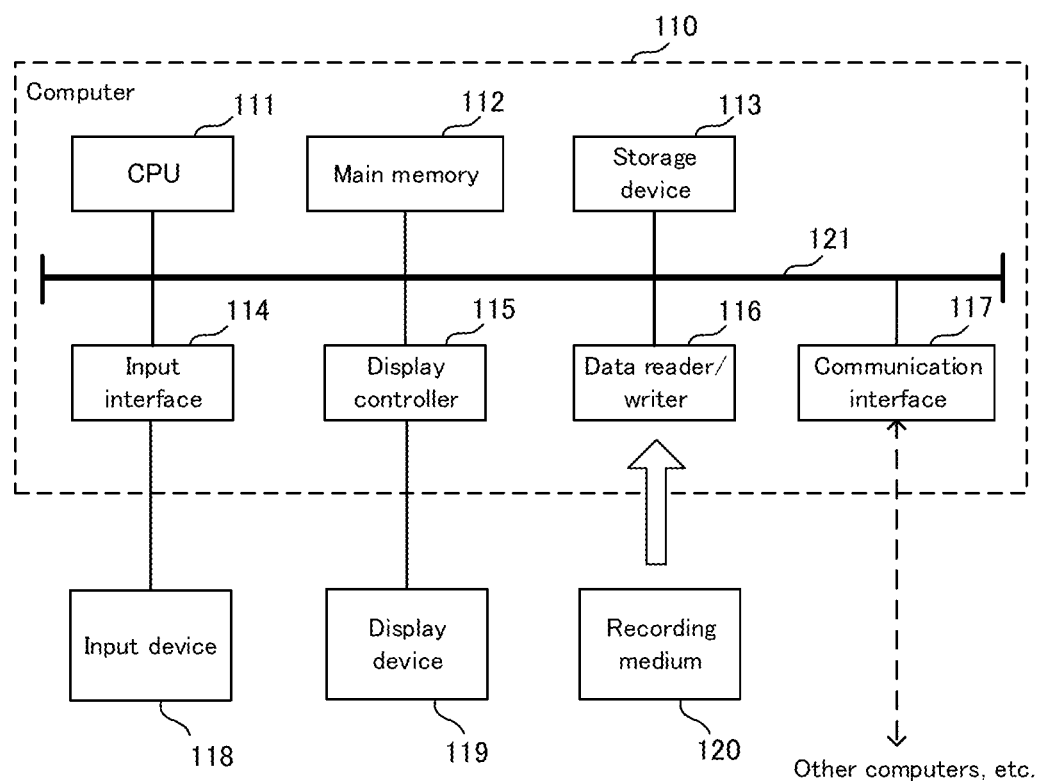
FIG. 7 is a block diagram showing an example of a computer that realizes the information delivery device, the note-taker terminal and the user terminal in the embodiment of the present invention.

Here, a computer that realizes the information delivery device 100, the note-taker terminal 200 and the user terminal 300 by executing the programs in the embodiment will be described using FIG. 7. FIG. 7 is a block diagram showing an example of a computer that realizes the information delivery device, the note-taker terminal and the user terminal in the embodiment of the present invention.

As shown in FIG. 7, a computer 110 is provided with a CPU 111, a main memory 112, a storage device 113, an input interface 114, a display controller 115, a data reader/writer 116, and a communication interface 117. These units are connected to each other via a bus 121 in a manner that enables data communication.

The CPU 111 implements various types of operations by expanding the programs (code) of the present embodiment stored in the storage device 113 in the main memory 112 and executing these programs in a predetermined order. The main memory 112, typically, is a volatile storage device such as DRAM (Dynamic Random Access Memory). Also, the programs of the present embodiment are provided in a state of being stored in a computer-readable recording medium 120. Note that the programs of the present embodiment may be circulated on the Internet connected via the communication interface 117.

Also, specific examples of the storage device 113, apart from a hard disk, include a semiconductor storage device such as a flash memory. The input interface 114 mediates data transmission between the CPU 111 and an input device 118 such as a keyboard and a mouse. The display controller 115 is connected to a display device 119, and controls display on the display device 119.

The data reader/writer 116 mediates data transmission between the CPU 111 and the recording medium 120, and functions to read out programs from the recording medium 120 and write the results of processing by the computer 110 to the recording medium 120. The communication interface 117 mediates data transmission between the CPU 111 and other computers.

Also, specific examples of the recording medium 120 include a generic semiconductor storage device such as CF (Compact Flash (registered trademark)) or SD (Secure Digital), a magnetic storage medium such as flexible disk, and an optical storage medium such as CD-ROM (Compact Disk Read Only Memory).

Working Example 1

Figure 8:
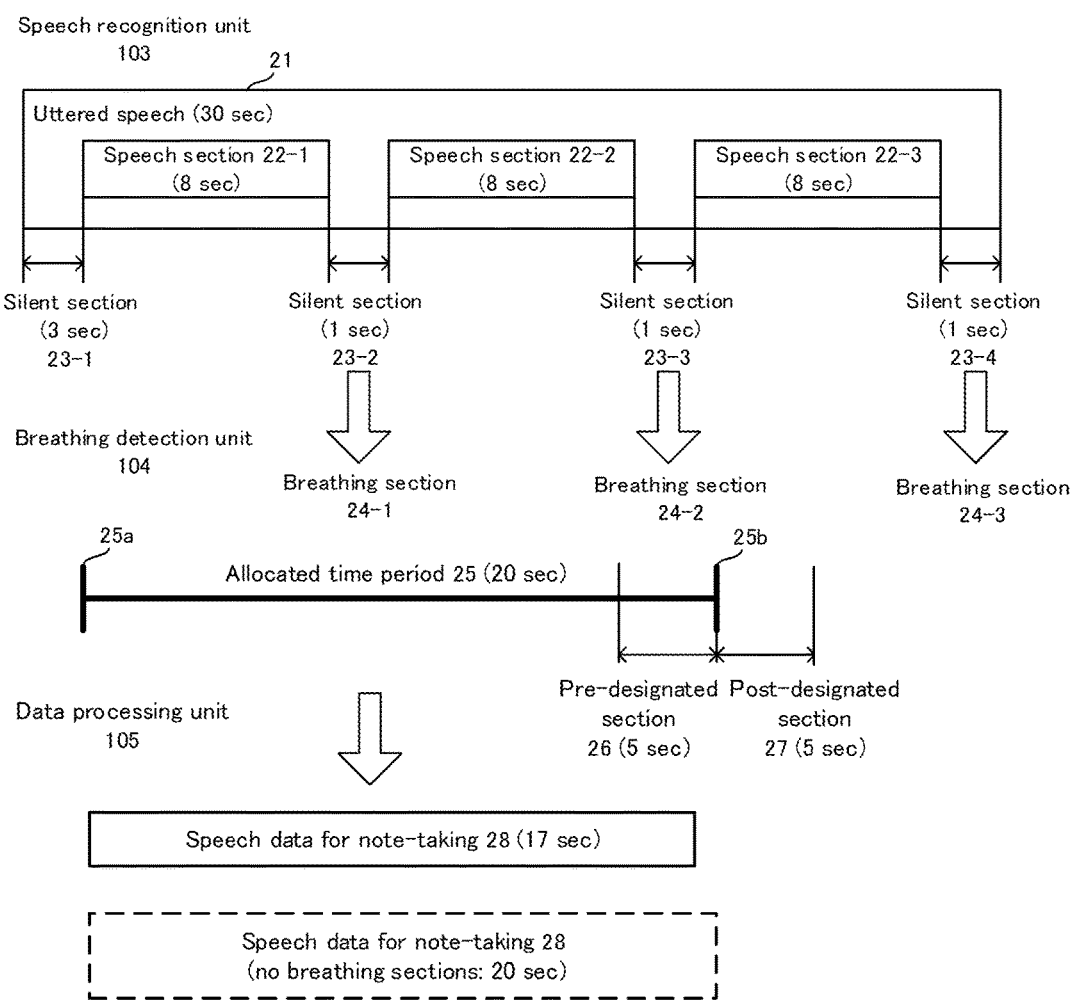
FIG. 8 is a diagram showing processing by the speech recognition unit, the breathing detection unit and the data processing unit in a working example of the present invention.

Next, a working example of the present invention will be described using FIG. 8. Note that description of the following working example is given in accordance with the steps shown in FIGS. 4 to 6. FIG. 8 is a diagram showing processing by the speech recognition unit, the breathing detection unit and the data processing unit in the working example of the present invention.

Step A1

First, the information delivery device 100 executes connection confirmation of network communication between the note-taker terminal 200 and the user terminal 300 (step A1). Assume that a speaker says "1+2=3" (one plus two equals three) in a lesson.

Steps A2 and A3

The video input unit 101 thereby acquires video data in MEPG-4 format or the like (step A2), and inputs the acquired video data to the data processing unit 105. The speech input unit 102 acquires speech data in PCM format or the like (step A3), and inputs the acquired speech data to the speech recognition unit 103.

Step A4

Next, the speech recognition unit 103, upon speech data of the uttered speech 21 being input from the speech input unit 102 in real time, separates this speech data into speech sections 22-1 to 22-3 and silent sections 23-1 to 23-4, as shown in FIG. 8. The speech recognition unit 103 then outputs information specifying the positions (start point and end point) of the separated silent sections 23-1 to 23-4 to the breathing detection unit 104.

Step A5

Next, the breathing detection unit 104 specifies the silent sections 23-1 to 23-4, based on the information from the speech recognition unit 103, and determines, for each silent section, whether the length of the silent section is less than or equal to 1 second, which is the threshold. In the example in FIG. 8, the silent sections 23-2 to 23-4 each have lengths of 1 second, and are thus respectively determined to be breathing sections 24-1 to 24-3.

Step A6

Next, the data processing unit 105 compares the breathing sections 24-1 to 24-3 determined by the breathing detection unit 104 to be breathing with the allocated time period 25 allocated to the note-taker 50. The data processing unit 105 then determines, for each breathing section, whether the breathing section exists in a section combining a pre-designated section 26 that is set before the end point 25b of the allocated time period 25 and a post-designated section 27 that is set after the end point 25b. Note that, in this working example, the length of the allocated time period 25 is set in 20 seconds. Also, the length of the pre-designated section 26 and the post-designated section 27 are respectively set to 5 seconds.

Specifically, the data processing unit 105 first checks the 1-second silent section 23-2 after the 8-second speech section 22-1, and determines that the condition is not satisfied with respect to this silent section. On the other hand, the data processing unit 105 checks the 1-second silent section 23-3 after the 8-second speech section 22-2, and determines that the condition is satisfied because the start point of the silent section 23-3 is located 17 seconds after the start point 25a of the allocated section 25 and has a length of 1 second.

The data processing unit 105 then reviews the allocated section, and generates speech data for note-taking 28 after changing the end point 25b of the allocated time period 25 to the start point (17 seconds after the start point 25a) of the breathing section 24-2. Also, the data processing unit 105 divides the video data input from the video input unit 101 according to the allocated time period (17 seconds) after the change, and generates video data for delivery.

Step A6

The data processing unit 105 then outputs the speech data for note-taking and the video data for delivery to the data transmission unit 106. Also, in this working example, speech data is transmitted in accordance with Voice/IP protocols, and video data is transmitted in accordance with TCP/IP protocols.

Step B1

In the note-taker terminal 200, the data reception unit 201 receives the video data and the speech data for note-taking.

Steps B2, B3 and B5

Next, the data reproduction unit 202 outputs the speech data for note-taking to the speech output device 30, and outputs the video data to the display unit 205. The video data is thereby displayed on the screen of the display device 31. Also, speech is reproduced from the speech output device 30, which is an audio speaker. In this working example, the speaker is heard saying "one plus two equals three".

Step B4

When the note-taker then selects, through the input device 32, a place where characters relating to what the speaker is saying are written on a blackboard while viewing the video, the image processing unit 204 extracts a still image of the selected place, and outputs image data of the extracted still image to the data processing unit 206.

Step B6

Also, when the note-taker inputs "1+2=3" (one plus two equals three) through the input device 32 while listening to what is being said, the input unit 203 outputs text data of the input text to the data processing unit 206.

Steps B7 and B8

Next, the data processing unit 206 outputs the text data input by the note-taker 50 and the image data of the still image to the data transmission unit 207 as one data set. The data transmission unit 207, upon receiving the data set from the data processing unit 206, then transmits this data set to the user terminal 300 in accordance with TCP/IP.

Steps C1 and C2

In the user terminal 300, the data reception unit 301 receives the data set transmitted from the note-taker terminal 200, and inputs this data set to the data reproduction unit 302. The data reproduction unit 302 breaks the data set down into the text data and the image data of the still image that are included therein, and inputs the respective data to the display unit 303.

Step C3

Next, the display unit 303, upon receiving the text data and the image data, displays the respective data in predetermined regions on the screen of the display device 33. Specifically, the display unit 303 displays the text data "1+2=3" in a character display area of the screen, and displays the still image in an image display area of the screen.

Because the contents of note-taking with regard to utterances of the speaker and related images are displayed on the terminal 300 of the user as a result of the above processing, a hearing-impaired person, who is the user, is able to understand the contents of the lesson.

Although the abovementioned embodiment can be partially or wholly represented by supplementary notes 1 to 20 described below, the present invention is not limited to the following description.

Supplementary Note 1

A note-taking assistance system for assisting note-taking of an utterance of a speaker includes a terminal for note-takers that is used by a note-taker who performs the note-taking, and an information delivery device that transmits speech data of the utterance to the terminal, the information delivery device including a breathing detection unit that specifies silent sections from speech of the utterance, and specifies a silent section that satisfies a set condition, among the specified silent sections, as a breathing section of the speaker, a data processing unit that determines, for every allocated time period that is allocated to the note-taker, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period, and a data transmission unit that transmits the speech data generated by the data processing unit to the terminal of the note-taker to whom the allocated time period is allocated, and the terminal for note-takers including a data reception unit that receives the speech data transmitted from the information delivery device, an input unit that accepts input of text data that is input in correspondence to the speech data, and a data transmission unit that transmits the text data whose input was accepted to a terminal for users that is used by a user of the note-taking.

Supplementary Note 2

In the note-taking assistance system according to supplementary note 1, the data transmission unit of the information delivery device further transmits video data corresponding to the allocated time period that is allocated to the note-taker to the terminal, the terminal for note-takers further includes an image processing unit that extracts a still image from the transmitted video data, according to an instruction from outside, and the data transmission unit of the terminal for note-takers transmits the text data whose input was accepted and image data of the extracted still image to the terminal for users.

Supplementary Note 3

In the note-taking assistance system according to supplementary note 1 or 2, the breathing detection unit, in a case where a length of the silent section is less than or equal to a threshold, specifies the specified silent section as the breathing section of the speaker.

Supplementary Note 4

In the note-taking assistance system according to any of supplementary notes 1 to 3, a length of the allocated time period that is allocated to the note-taker is set according to a note-taking ability of the note-taker.

Supplementary Note 5

An information delivery device for transmitting speech data of an utterance of a speaker to a terminal for note-takers that is used by a note-taker who performs note-taking of the utterance includes a breathing detection unit that specifies silent sections from speech of the utterance, and specifies a silent section that satisfies a set condition, among the specified silent sections, as a breathing section of the speaker, a data processing unit that determines, for every allocated time period that is allocated to the note-taker, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period, and a data transmission unit that transmits the speech data generated by the data processing unit to the terminal of the note-taker to whom the allocated time period is allocated.

Supplementary Note 6

In the information delivery device according to supplementary note 5, the data transmission unit further transmits video data corresponding to the allocated time period that is allocated to the note-taker to the terminal.

Supplementary Note 7

In the information delivery device according to supplementary note 5 or 6, the breathing detection unit, in a case where a length of the specified silent section is less than or equal to a threshold, specifies the specified silent section as the breathing section of the speaker.

Supplementary Note 8

In the information delivery device according to any of supplementary notes 5 to 7, a length of the allocated time period that is allocated to the note-taker is set according to a note-taking ability of the note-taker.

Supplementary Note 9

A terminal that is used by a note-taker who performs note-taking of an utterance of a speaker includes a data reception unit that receives, for every allocated time period that is allocated to the note-taker, speech data of the utterance from an information delivery device that transmits the speech data, an input unit that accepts input of text data that is input in correspondence to the speech data, and a data transmission unit that transmits the text data whose input was accepted to a terminal for users that is used by a user of the note-taking.

Supplementary Note 10

The terminal according to supplementary note 9 further includes an image processing unit that, in a case where the information delivery device transmits video data corresponding to the allocated time period that is allocated to the note-taker to the terminal, extracts a still image from the transmitted video data, according to an instruction from outside, and the data transmission unit transmits the text data whose input was accepted and image data of the extracted still image to the terminal for users.

Supplementary Note 11

A note-taking assistance method for assisting note-taking using a terminal for note-takers that is used by a note-taker who performs note-taking of an utterance of a speaker and an information delivery device that transmits speech data of the utterance to the terminal includes the steps of (a) using the information delivery device to specify silent sections from speech of the utterance, and specify a silent section that satisfies a set condition, among the specified silent sections, as a breathing section of the speaker, (b) using the information delivery device to determine, for every allocated time period that is allocated to the note-taker, whether the breathing section exists in a range that is based on an end point of the allocated time period, and generate, in a case where the breathing section exists in the range, speech data of the utterance from a start point of the allocated time period until the breathing section, and, in a case where the breathing section does not exist in the range, speech data of the utterance from the start point until the end point of the allocated time period, (c) using the information delivery device to transmit the speech data generated in the step (b) to the terminal of the note-taker to whom the allocated time period is allocated, (d) using the terminal for note-takers to receive the speech data transmitted from the information delivery device, (e) using the terminal for note-takers to accept input of text data that is input in correspondence to the speech data, and (f) using the terminal for note-takers to transmit the text data whose input was accepted in the step (e) to a terminal for users that is used by a user of the note-taking.

Supplementary Note 12

The note-taking assistance method according to supplementary note 11 further includes the steps of (g) using the information delivery device to further transmit video data corresponding to the allocated time period that is allocated to the note-taker to the terminal, and (h) using the terminal for note-takers to extract a still image from the video data transmitted at the step (g), according to an instruction from outside, and the step (f) comprises transmitting the text data whose input was accepted at the step (e) and image data of the still image extracted at the step (h) to the terminal for users.

Supplementary Note 13

In the note-taking assistance method according to supplementary note 11 or 12, the step (a) comprises, in a case where a length of the silent section is less than or equal to a threshold, specifying the specified silent section as the breathing section of the speaker.

Supplementary Note 14

In the note-taking assistance method according to any of supplementary notes 11 to 13, a length of the allocated time period that is allocated to the note-taker is set according to a note-taking ability of the note-taker.

Supplementary Note 15

A computer-readable recording medium storing a computer program for transmitting, by computer, speech data of an utterance of a speaker to a terminal for note-takers that is used by a note-taker who performs note-taking of the utterance, the computer program including a command for causing the computer to execute the steps of (a) specifying silent sections from speech of the utterance, and specifying a silent section that satisfies a set condition, among the specified silent sections, as a breathing section of the speaker, (b) determining, for every allocated time period that is allocated to the note-taker, whether the breathing section exists in a range that is based on an end point of the allocated time period, and generating, in a case where the breathing section exists in the range, speech data of the utterance from a start point of the allocated time period until the breathing section, and, in a case where the breathing section does not exist in the range, speech data of the utterance from the start point until the end point of the allocated time period, and (c) transmitting the speech data generated in the step (b) to the terminal of the note-taker to whom the allocated time period is allocated.

Supplementary Note 16

In the computer-readable recording medium according to supplementary note 15, the step (c) further comprises transmitting video data corresponding to the allocated time period that is allocated to the note-taker to the terminal Supplementary Note 17

In the computer-readable recording medium according to supplementary note 15 or 16, the step (a) comprises, in a case where a length of the specified silent section is less than or equal to a threshold, specifying the specified silent section as the breathing section of the speaker.

Supplementary Note 18

In the computer-readable recording medium according to any of supplementary notes 15 to 17, a length of the allocated time period that is allocated to the note-taker is set according to a note-taking ability of the note-taker.

Supplementary Note 19

A computer-readable recording medium storing a computer program that includes a command for causing a computer that is used by a note-taker who performs note-taking of an utterance of a speaker to execute the steps of (a) receiving, for every allocated time period that is allocated to the note-taker, speech data of the utterance from an information delivery device that transmits the speech data, (b) accepting input of text data that is input in correspondence to the speech data, and (c) transmitting the text data accepted in the step (b) to a terminal for users that is used by a user of the note-taking.

Supplementary Note 20

In the computer-readable recording medium according to supplementary note 19, the computer program includes a command for causing the computer to execute the step of (d), in a case where the information delivery device further transmits video data corresponding to the allocated time period that is allocated to the note-taker, extracting a still image from the transmitted video data, according to an instruction from outside, and the step (c) comprises transmitting the text data whose input was accepted and image data of the extracted still image to the terminal for users.

Also, the present invention is not limited to the above-mentioned embodiment and working example, and can also be used in order to assist interpreting of the utterances of a speaker. That is, the present invention may relate to a system, an information delivery device, a terminal and an interpreting assistance method that are used to assist interpreting, and to a computer-readable recording medium storing a computer program for realizing the same. In this case, the features thereof are as follows.

A system for assisting interpreting of an utterance of a speaker in the present invention includes a terminal for interpreters that is used by an interpreter who performs the interpreting, and an information delivery device that transmits speech data of the utterance to the terminal, the information delivery device including a breathing detection unit that specifies silent sections from speech of the utterance, and specifies a silent section that satisfies a set condition, among the specified silent sections, as a breathing section of the speaker, a data processing unit that determines, for every allocated time period that is allocated to the interpreter, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period, and a data transmission unit that transmits the speech data generated by the data processing unit to the terminal of the interpreter to whom the allocated time period is allocated, and the terminal for interpreters including a data reception unit that receives the speech data transmitted from the information delivery device, an input unit that accepts input of text data that is input in correspondence to the speech data, and a data transmission unit that transmits the text data whose input was accepted to a terminal for users that is used by a user of the interpreting.

An information delivery device for transmitting speech data of an utterance of a speaker to a terminal for interpreters that is used by an interpreter who interprets the utterance according to the present invention includes a breathing detection unit that specifies silent sections from speech of the utterance, and specifies a silent section that satisfies a set condition, among the specified silent sections, as a breathing section of the speaker, a data processing unit that determines, for every allocated time period that is allocated to the interpreter, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period, and a data transmission unit that transmits the speech data generated by the data processing unit to the terminal of the interpreter to whom the allocated time period is allocated.

A terminal that is used by an interpreter who interprets an utterance of a speaker according to the present invention includes a data reception unit that receives, for every allocated time period that is allocated to the interpreter, speech data of the utterance from an information delivery device that transmits the speech data, an input unit that accepts input of text data that is input in correspondence to the speech data, and a data transmission unit that transmits the text data whose input was accepted to a terminal for users that is used by a user of the interpreting.

An interpreting assistance method for assisting interpreting using a terminal for interpreters that is used by an interpreter who interprets an utterance of a speaker and an information delivery device that transmits speech data of the utterance to the terminal according to the present invention includes the steps of (a) using the information delivery device to specify silent sections from speech of the utterance, and specify a silent section that satisfies a set condition, among the specified silent sections, as a breathing section of the speaker, (b) using the information delivery device to determine, for every allocated time period that is allocated to the interpreter, whether the breathing section exists in a range that is based on an end point of the allocated time period, and generate, in a case where the breathing section exists in the range, speech data of the utterance from a start point of the allocated time period until the breathing section, and, in a case where the breathing section does not exist in the range, speech data of the utterance from the start point until the end point of the allocated time period, (c) using the information delivery device to transmit the speech data generated in the step (b) to the terminal of the interpreter to whom the allocated time period is allocated, (d) using the terminal for interpreters to receive the speech data transmitted from the information delivery device, (e) using the terminal for interpreters to accept input of text data that is input in correspondence to the speech data, and (f) using the terminal for interpreters to transmit the text data whose input was accepted in the step (e) to a terminal for users that is used by a user of the interpreting.

A computer-readable recording medium storing a computer program for transmitting, by computer, speech data of an utterance of a speaker to a terminal for interpreters that is used by an interpreter who performs interpreting of the utterance according to the present invention, the computer program including a command for causing the computer to execute the steps of (a) specifying silent sections from speech of the utterance, and specifying a silent section that satisfies a set condition, among the specified silent sections, as a breathing section of the speaker, (b) determining, for every allocated time period that is allocated to the interpreter, whether the breathing section exists in a range that is based on an end point of the allocated time period, and generating, in a case where the breathing section exists in the range, speech data of the utterance from a start point of the allocated time period until the breathing section, and, in a case where the breathing section does not exist in the range, speech data of the utterance from the start point until the end point of the allocated time period, and (c) transmitting the speech data generated in the step (b) to the terminal of the interpreter to whom the allocated time period is allocated.

Another computer-readable recording medium according to the present invention stores a computer program that includes a command for causing a computer that is used by an interpreter who performs interpreting of an utterance of a speaker to execute the steps of (a) receiving, for every allocated time period that is allocated to the interpreter, speech data of the utterance from an information delivery device that transmits the speech data, (b) accepting input of text data that is input in correspondence to the speech data, and (c) transmitting the text data accepted in the step (b) to a terminal for users that is used by a user of the interpreting.

Although the instant invention has been described above with reference to an embodiment and a working example, the invention is not intended to be limited to the above embodiment and working example. A person skilled in the art will appreciate that the configurations and details of the instant invention can be variously modified within the scope of the invention.

This application claims priority from Japanese Patent Application No. 2013-056292 filed on Mar. 19, 2013, the entire disclosure of which is herein incorporated by reference.

INDUSTRIAL APPLICABILITY

According to the present invention, as described above, a hearing-impaired person can be provided with accurate information, even in the case where the person carrying out the note-taking has little note-taking experience. The present invention is not limited to school classes and the like, and is also useful in various types of lectures and the like in any field where note-taking is required.

DESCRIPTION OF REFERENCE NUMERALS

10 Video input device
20 Speech input device
21 Uttered speech
22-1 to 22-3 Speech section
23-1 to 23-4 Silent section
24-1 to 24-4 Breathing section
25 Allocated time
25a Starting point
25b End point
26 Pre-designated section
27 Post-designated section
28 Speech data for note-taking
30 Speech output device
31 Display device
32 Input device
33 Display device
40 Speaker
50 Note-taker
60 User
100 Information delivery device
101 Video input unit
102 Speech input unit
103 Speech recognition unit
104 Breathing detection unit
105 Data processing unit
106 Data transmission unit
110 Computer
111 CPU
112 Main memory
113 Storage device
114 Input interface
115 Display controller
116 Data reader/writer
117 Communication interface
118 Input device
119 Display device
120 Recording medium
121 Bus
200 Note-taker terminal
201 Data reception unit
202 Data reproduction unit
203 Input unit
204 Image processing unit
205 Display unit
206 Data processing unit
207 Data transmission unit
300 User terminal
301 Data reception unit
302 Data reproduction unit
303 Display unit
400 Note-taking assistance system
410 Network

The invention claimed is:

1. A system for assisting note-taking of an utterance of a speaker, comprising:
a terminal for note-takers that is used by a note-taker who performs the note-taking; and
an information delivery device that transmits speech data of the utterance to the terminal,
wherein the information delivery device includes:
a breathing detection unit that specifies silent sections from speech of the utterance, and specifies a silent section that satisfies a set condition, among the specified silent sections, as a breathing section of the speaker;
a data processing unit that determines, for every allocated time period that is allocated to the note-taker, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period; and
a data transmission unit that transmits the speech data generated by the data processing unit to the terminal of the note-taker to whom the allocated time period is allocated, and
the terminal for note-takers includes:
a data reception unit that receives the speech data transmitted from the information delivery device;
an input unit that accepts input of text data that is input in correspondence to the speech data; and
a data transmission unit that transmits the text data whose input was accepted to a terminal for users that is used by a user of the note-taking,
wherein the information delivery device and the terminal are realized by a computer, wherein in the computer realizing the information delivery device, a CPU of the computer functions as the breathing detection unit, the data processing unit, and data transmission unit, wherein in the computer realizing the terminal, a CPU of the computer functions as the data reception unit, the input unit, and the data transmission unit.

2. In the note-taking assistance system according to claim 1,
wherein the data transmission unit of the information delivery device further transmits video data corresponding to the allocated time period that is allocated to the note-taker to the terminal,
the terminal for note-takers further includes an image processing unit that extracts a still image from the transmitted video data, according to an instruction from outside, and
the data transmission unit of the terminal for note-takers transmits the text data whose input was accepted and image data of the extracted still image to the terminal for users,
wherein in the computer realizing the terminal, the CPU of the computer functions as the image processing unit.

3. In the note-taking assistance system according to claim 1, wherein the breathing detection unit, in a case where a length of the silent section is less than or equal to a threshold, specifies the extracted silent section as the breathing section of the speaker.

4. In the note-taking assistance system according to any of claim 1, wherein a length of the allocated time period that is allocated to the note-taker is set according to a note-taking ability of the note-taker.

5. An information delivery device for transmitting speech data of an utterance of a speaker to a terminal for note-takers that is used by a note-taker who performs note-taking of the utterance, comprising:
   a breathing detection unit that specifies silent sections from speech of the utterance, and specifies a silent section that satisfies a set condition, among the specified silent sections, as a breathing section of the speaker;
   a data processing unit that determines, for every allocated time period that is allocated to the note-taker, whether the breathing section exists in a range that is based on an end point of the allocated time period, and generates, in a case where the breathing section exists in the range, speech data of the utterance from a start point of the allocated time period until the breathing section, and, in a case where the breathing section does not exist in the range, speech data of the utterance from the start point until the end point of the allocated time period; and
   a data transmission unit that transmits the speech data generated by the data processing unit to the terminal of the note-taker to whom the allocated time period is allocated,
   wherein the information delivery device is realized by a computer, wherein in the computer realizing the information delivery device, a CPU of the computer functions as the breathing detection unit, the data processing unit and data transmission unit.

6. A note-taking assistance method for assisting note-taking using a terminal for note-takers that is used by a note-taker who performs note-taking of an utterance of a speaker and an information delivery device that transmits speech data of the utterance to the terminal, comprising the steps of:
   (a) using the information delivery device to specify silent sections from speech of the utterance, and specify a silent section that satisfies a set condition, among the specified silent sections, as a breathing section of the speaker;
   (b) using the information delivery device to determine, for every allocated time period that is allocated to the note-taker, whether the breathing section exists in a range that is based on an end point of the allocated time period, and generate, in a case where the breathing section exists in the range, speech data of the utterance from a start point of the allocated time period until the breathing section, and, in a case where the breathing section does not exist in the range, speech data of the utterance from the start point until the end point of the allocated time period;
   (c) using the information delivery device to transmit the speech data generated in the step (b) to the terminal of the note-taker to whom the allocated time period is allocated;
   (d) using the terminal for note-takers to receive the speech data transmitted from the information delivery device;
   (e) using the terminal for note-takers to accept input of text data that is input in correspondence to the speech data; and
   (f) using the terminal for note-takers to transmit the text data whose input was accepted in the step (e) to a terminal for users that is used by a user of the note-taking.

7. A non-transitory computer-readable recording medium storing a computer program for transmitting, by computer, speech data of an utterance of a speaker to a terminal for note-takers that is used by a note-taker who performs note-taking of the utterance, the computer program including a command for causing the computer to execute the steps of:
   (a) specifying silent sections from speech of the utterance, and specifying a silent section that satisfies a set condition, among the specified silent sections, as a breathing section of the speaker;
   (b) determining, for every allocated time period that is allocated to the note-taker, whether the breathing section exists in a range that is based on an end point of the allocated time period, and generating, in a case where the breathing section exists in the range, speech data of the utterance from a start point of the allocated time period until the breathing section, and, in a case where the breathing section does not exist in the range, speech data of the utterance from the start point until the end point of the allocated time period; and
   (c) transmitting the speech data generated in the step (b) to the terminal of the note-taker to whom the allocated time period is allocated,
   wherein the program is expanding in the memory of the computer, wherein a CPU of the computer execute the program expanding in the memory to carry out steps (a) to (c).

* * * * *